(12) United States Patent
Davidson et al.

(10) Patent No.: US 6,698,693 B2
(45) Date of Patent: Mar. 2, 2004

(54) SOLAR PROPULSION ASSIST

(76) Inventors: Mark P. Davidson, 807 Rorke Way, Palo Alto, CA (US) 94303; Mario Rabinowitz, 715 Lakemead Way, Redwood City, CA (US) 94062-3922

( * ) Notice: Subject to any disclaimer, the term of this patent is extended or adjusted under 35 U.S.C. 154(b) by 62 days.

(21) Appl. No.: 10/124,538

(22) Filed: Apr. 16, 2002

(65) Prior Publication Data

US 2003/0192998 A1 Oct. 16, 2003

(51) Int. Cl.[7] .................................................. B64G 1/44
(52) U.S. Cl. ..................... 244/173; 136/292; 126/689; 60/224; 244/62; 244/172
(58) Field of Search .......................... 244/158 R, 168, 244/172, 173, 62, 58; 126/689, 693; 136/246, 292; 359/641, 853; 60/224

(56) References Cited

U.S. PATENT DOCUMENTS

| | | | | |
|---|---|---|---|---|
| 3,466,119 A | * | 9/1969 | Francia | 350/299 |
| 3,670,323 A | * | 6/1972 | Sobel et al. | 340/324 R |
| 4,305,555 A | * | 12/1981 | Davis | 244/158 R |
| 4,354,348 A | * | 10/1982 | Lee | 244/172 |
| 4,371,135 A | * | 2/1983 | Keigler | 244/173 |
| 4,614,319 A | * | 9/1986 | Drexler | 244/172 |
| 4,781,018 A | * | 11/1988 | Shoji | 60/203.1 |
| 5,054,466 A | * | 10/1991 | White et al. | 126/438 |
| 5,274,497 A | * | 12/1993 | Casey | 359/364 |
| 5,395,070 A | * | 3/1995 | Stirbl et al. | 244/58 |
| 5,685,505 A | * | 11/1997 | Meckler | 244/169 |
| 6,290,185 B1 | * | 9/2001 | DeMars et al. | 244/172 |
| 6,488,233 B1 | * | 12/2002 | Myrabo | 244/62 |

* cited by examiner

Primary Examiner—Galen Barefoot (57) ABSTRACT

This invention relates generally to method and apparatus for solar-boost assist and solar-sail assist by a mini-optics light concentrator system utilizing a dynamic ensemble of mini-mirrors. In the boost phase of a rocket ship launch, the system focusses solar energy into the rocket chamber to raise the temperature of the propellant and increase the impulse. In the mid-course phase, the system focusses solar energy onto the rocket's solar sail to increase the thrust. In both cases, the system reduces the weight of the rocket by providing a weightless source of thrust.

24 Claims, 6 Drawing Sheets

SOLAR PROPULSION ASSIST

BACKGROUND OF THE INVENTION

1. Field of the Invention

This invention relates generally to method and apparatus for solar-boost assist and solar-sail assist by a mini-optics light concentrator system utilizing a dynamic ensemble of mini-mirrors. In the boost phase of a rocket ship launch, the system focusses solar energy into the rocket chamber to raise the temperature of the propellant and increase the impulse. In the mid-course phase, the system focusses solar energy onto the rocket's solar sail to increase the thrust. In both cases, the system reduces the weight of the rocket by providing a weightless source of thrust.

2. Description of the Prior Art

The prior art is limited to "direct observation displays" wherein images are viewed directly. None of the prior art deals in any way with rocket ship propulsion. There are many prior art patents that deal with twisting balls (gyricon) displays or separable balls displays. Electric or magnetic fields are used to orient or move polarized or charged bi-colored (gyricon) balls in the prior art. Since mirrors are not incorporated in the prior art, none of them utilizes the balls to optically reflect or focus light as in our invention. These verities are evident from an examination of the prior art. A large representative sample of the prior art will now be enumerated and described. This together with the references contained therein constitutes a comprehensive compendium of the prior art.

U.S. Pat. No. 5,754,332 issued to J. M. Crowley on May 19,1998 deals with gyricon bi-colored balls whose reflectance is comparable with white paper. The object is to produce a monolayer gyricon direct observation ball display.

U.S. Pat. No. 5,808,783 issued to J. M. Crowley on Sep. 15, 1998 deals with gyricon bi-colored balls "having superior reflectance characteristics comparing favorably with those of white paper." Again the objective is a direct observation ball display application.

U.S. Pat. No. 5,914,805 issued to J. M. Crowley on Jun. 22, 1999 utilizes two sets of gyricon bi-colored balls "having superior reflectance characteristics comparing favorably with those of white paper" for direct observation ball display purposes.

U.S. Pat. No. 6,055,091 issued to N. K. Sheridon and J. M. Crowley on Apr. 25, 2000 utilizes gyricon bi-colored cylinders. Again the objective is a direct observation display application.

U.S. Pat. No. 6,072,621 issued to E. Kishi, T. Yagi and T. Ikeda on Jun. 6, 2000 utilizes sets of different mono-colored polarized balls which are separable for a direct observation ball display device.

U.S. Pat. No. 6,097,531 issued to N. K. Sheridon on Aug. 1, 2000 teaches a method for making magnetized elements (balls or cylinders) for a gyricon direct observation display.

U.S. Pat. No. 6,120,588 issued to J. M. Jacobson on Sep. 19, 2000 describes a direct observation ball display device which uses mono-colored elements that are electronically addressable to change the pattern of the ball display.

U.S. Pat. No. 6,174,153 issued to N. K. Sheridon on Jan. 16, 2001 teaches apparatus for the purpose of a gyricon direct observation ball display.

U.S. Pat. No. 6,192,890 B1 issued to D. H. Levy and J.-P. F. Cherry on Feb. 27, 2001 is for a changeable tattoo direct observation ball display using magnetic or electric fields to manipulate particles in the ball display.

U.S. Pat. No. 6,211,998 B1 issued to N. K. Sheridon on Apr. 3, 2001 teaches a method of addressing a direct observation ball display by a combination of magnetic and electric means. U.S. Pat. No. 6,262,707 B1 issued to N. K. Sheridon on Jul. 17, 2001 has a similar teaching for a gyricon ball display.

A large number of prior art devices have been described, all of which are directed at addressing and changing the pattern of a direct observation ball display device. While there are other such prior art teachings, none of them teaches or anticipates our invention.

DEFINITIONS

"Bipolar" refers herein to either a magnetic assemblage with the two poles north and south, or an electric system with + and− charges separated as in an electret.

"Compaction" refers to increasing the density of a collection (ensemble) of objects by geometrical arrangement or other means.

"Collimated" refers herein to an approximately parallel beam of light.

"Elastomer" is a material such as synthetic rubber or plastic, which at ordinary temperatures can be stretched substantially under low stress, and upon immediate release of the stress, will return with force to approximately its original length.

"Electret" refers to a solid dielectric possessing persistent electric polarization, by virtue of a long time constant for decay of charge separation.

"Electrophoresis or Electrophoretic" is an electrochemical process in which colloidal particles or macromolecules with a net electric charge migrate in a solution under the influence of an electric current. It is also known as cataphoresis.

"Focussing planar mirror" is a thin almost planar mirror constructed with stepped varying angles so as to have the optical properties of a much thicker concave (or convex) mirror. It can heuristically be thought of somewhat as the projection of thin equi-angular segments of small portions of a thick mirror upon a planar surface. It is a focusing planar reflecting surface much like a planar Fresnel lens is a focusing transmitting surface. The dynamic-focussing property of an ensemble of tiny elements which make up the focussing planar mirror are an essential feature of the instant invention.

"Immiscible" herein refers to two fluids which are incapable of mixing.

"Packing fraction" herein refers to the fraction of an available volume or area occupied by a collection (ensemble) of objects.

"Pixel" refers to the smallest element of an array of elements that make up an image.

"Polar gradient" as used herein relates to magnetic optical elements that are controlled in the non-gyricon mode such as in the magnetic field gradient mode.

"Monopolar" as used herein denotes mono-charged optical elements that are controlled in the non-gyricon mode such as the electrophoretic mode.

"Rayleigh limit" relates to the optical limit of resolution which can be used to determine the smallest size of the elements that constitute a mini-mirror. Lord Rayleigh discovered this limit from a study of the appearance of the diffraction patterns of closely spaced point sources.

"Spin glass" refers to a wide variety of materials which contain interacting atomic magnetic moments. They possess a form of disorder, in which the magnetic susceptability undergoes an abrupt change at what is called the freezing temperature for the spin system.

"Thermoplastic" refers to materials with a molecular structure that will soften when heated and harden when cooled. This includes materials such as vinyls, nylons, elastomers, fuorocarbons, polyethylenes, styrene, acrylics, cellulosics, etc.

"Translucent" as used herein refers to materials that pass or transmit light of only certain wavelengths so that the transmitted light is colored.

SUMMARY OF THE INVENTION

There are many aspects and applications of this invention, which provides techniques applicable individually or in combination for solar-boost assist and solar-sail assist by a mini-optics light concentrator system utilizing a dynamic ensemble of mini-mirrors. Primarily this invention deals with the broad general concept of method and apparatus for rocket ship assist in the boost and/or in the mid-course phases. In both cases, the system reduces the weight of the rocket by providing a weightless source of thrust. As will be described in detail, these objectives may be accomplished by any of a number of ways separately or in combination, as taught by our invention It is a general object of this invention to provide solar-boost assist and solar-sail assist by a mini-optics light concentrator system utilizing a dynamic ensemble of mini-mirrors.

Another objective is to provide rocket ship solar-boost assist by focussing solar energy into the rocket chamber to raise the temperature of the propellant and increase the impulse.

Another object is to provide rocket ship mid-course phase assist by focussing solar energy onto the rocket's solar sail to increase the thrust.

Other objects and advantages of the invention will be apparent in a description of specific embodiments thereof, given by way of example only, to enable one skilled in the art to readily practice the invention as described hereinafter with reference to the accompanying drawings.

DETAILED DESCRIPTION OF THE PRESENTLY PREFERRED EMBODIMENTS

Figure 1:
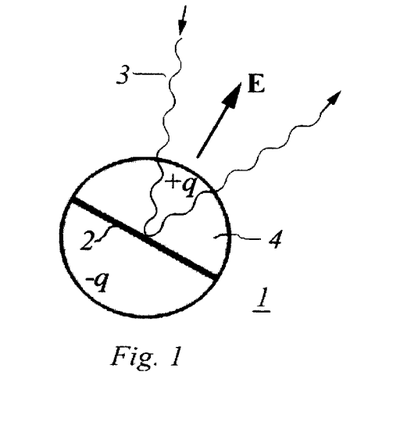
FIG. 1 is a cross-sectional view of an electrically charged bipolar sphere with an equatorial flat reflecting surface. This sphere is one of a multitude of optical elements which actively reflect and focus incident light.

FIG. 1 shows a rotatable element 1 of a focussing planar mini-mirror with an equatorial flat reflecting surface 2 to actively reflect and focus an incident beam of light 3. The element 1 shown is a cross-sectional view of an electrically charged bipolar sphere 4 with charge +q in one hemisphere and charge −q in the opposite hemisphere, that is operated in the well-known electrical gyricon mode. This sphere 4, shown here to operate by means of an electric field E, is one of a multitude of rotatable optical elements 1 which reflect and focus incident light. The active element 1 may operate in any of the well-known gyricon modes, such as electrical monopolar, magnetic, polar gradient, or combination thereof.

It should be noted that the elements in prior art "direct observation display modes" must be able to rotate 180 degrees without binding up, in order to display a generally black or white side up. In the instant invention, a 90 degree rotation of the active element 1 is more than sufficient as this produces a 180 degree reflection of the incident beam of light, since the angle of reflection is equal to the angle of incidence on the active reflecting element 1. Thus a doubling of the angle is produced in the instant invention.

Figure 2:
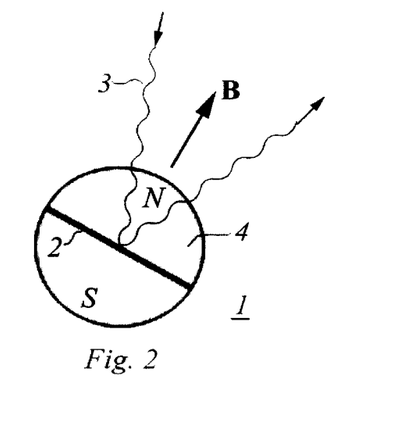
FIG. 2 is a cross-sectional view of a magnetically charged bipolar sphere with an equatorial flat reflecting surface. This sphere is one of a multitude of optical elements, which actively reflect and focus incident light.

FIG. 2 shows a rotatable active element 1 of a focussing planar mini-mirror with a flat equatorial reflecting surface 2 which reflects and focusses a beam of incident light 3. The element 1 shown is a cross-sectional view of a magnetically charged bipolar sphere 4 with north magnetic field N in one hemisphere and south magnetic field S in the other hemisphere, that is operated in the well-known magnetic gyricon mode. This sphere 4, shown here to operate by means of a magnetic field B, is one of a multitude of active rotatable optical elements 1 which reflect and focus incident light. The material of element 1 in all the figures needs to be transparent or translucent so the incident light can reach the reflecting surface 2.

The active element 1 may also be operated in any of the well-known gyricon modes, such as electrical monopolar, magnetic, polar gradient, or combination thereof. Two-axis control is possible in mutually orthogonal directions by means of embedded charge +q and −q at top and bottom, and orthogonally embedded magnetic field with north magnetic field N at one end and south magnetic field S at the other end. Two-axis control can also be accomplished with either an E or B field singly.

Figure 3:
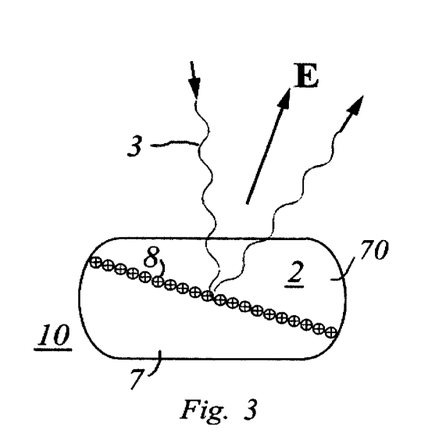
FIG. 3 is a cross-sectional view of a monopolar electric cell filled with two immiscible fluids, and shiny charged particles of the same sign in the bottom one. This cell is one of a multitude of optical elements which actively reflect and focus incident light.

FIG. 3 shows a fixed element 10 of a focussing planar mini-mirror which is a cross-sectional view of a monopolar electric cell 2 partially filled with a bottom fluid 7 with shiny charged particles 8 of the same sign (shown here as +, but which could also all be −), and a top transparent fluid 70. The two fluids are immiscible. When an electromagnetic field E is applied, the particles 8 coalesce to form a flat reflecting surface at the interface between fluid 7 and fluid 70, as also influenced by surface tension and meniscus. Fluid 70 could be air, but a transparent fluid of substantially less density than fluid 7 is preferred so that gravity will act to maintain their relative top/bottom orientations. If the particles 8 are small enough to form a colloidal suspension, the density of the particles 8 and the fluid 7 may differ. However, it is generally preferable to have the density of the particles 8 approximately matched to the fluid 7.

The orientation of this flat active reflecting surface formed by the shiny charged particles 8 can be controlled by an electric field E to reflect incident light 3. Until E is applied, as an optional capability the particles 8 and the fluid 7 can function as a transparent window when the particles 8 are nanosize i.e. much smaller than the wavelength of the incident light and the fluid 7 is transparent or translucent while they are dispersed in the fluid 7. For the case of dispersed transparency, the particles 8 should be <<4000 Å ($4\times10^{-7}$ m). This cell 2 is one of a multitude of optical elements 1 which reflect and focus incident light 3. The particles 8 may include a wide variety of electomagnetically interactive materials such as electret, optoelectric, conducting, thermoelectric, electrophoretic, resistive, semiconductive, insulating, piezoelectric, magnetic, ferromagnetic, paramagnetic, diamagnetic, or spin (e.g. spin glass) materials. It should be noted that the active reflecting area remains constant for spherical and circular-cylindrical cells, as the orientation of the reflecting surface changes. However, the change in reflecting area with orientation is not a serious problem for the non-spherical, non-circular cell geometry shown.

Figure 4:
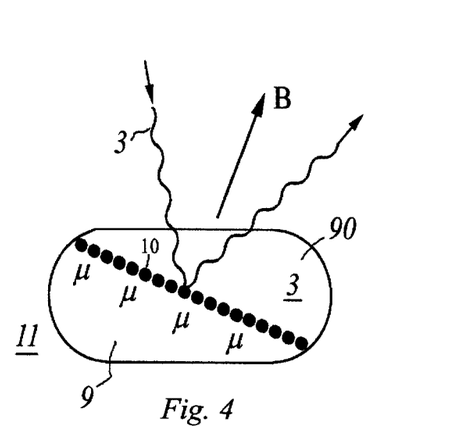
FIG. 4 is a cross-sectional view of a ferrofluid cell partially filled with a colloidal suspension of shiny ferromagnetic particles in a fluid. This cell is one of a multitude of optical elements which actively reflect and focus incident light.

FIG. 4 shows a fixed element 11 of a focussing planar mini-mirror which is a cross-sectional view of a ferrofluid cell 3 partially filled with a ferrofluid 9 containing shiny ferromagnetic particles 10 of high permeability $\mu$, and a top transparent or translucent fluid 90. The two fluids are immiscible. When an inhomogeneous electromagnetic field B of increasing gradient is applied, the particles 10 are drawn to the region of increasing gradient and coalesce to form an active flat reflecting surface, as shown, at the interface between fluid 9 and fluid 90, as also influenced by surface tension and meniscus. Fluid 90 could be air or a transparent fluid of substantially less density than fluid 9 so that gravity will act to maintain their relative top/bottom orientations. The orientation of the active flat reflecting surface can be controlled by B to reflect incident light 3. This cell 3 is one of a multitude of optical elements 1 which reflect and focus incident light 3. The particles 10 are small enough to form a colloidal suspension, and are coated to prevent coalescence until B is applied, as is well known in the art. It should be noted that the reflecting area remains constant for spherical and circular-cylindrical cells, as the orientation of the active reflecting surface changes. However, the increase in reflecting area as the fluid 9 is inclined, is not a serious problem for the non-spherical, non-circular cell geometry shown.

Figure 5:
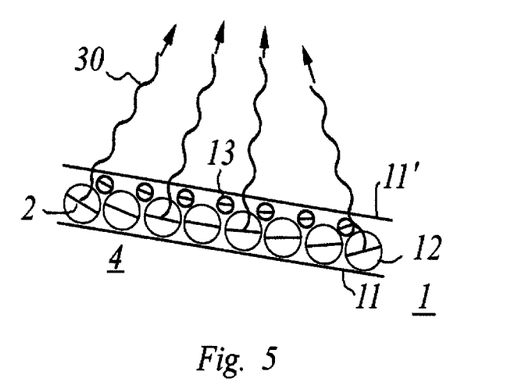
FIG. 5 is a cross-sectional view of a mini-optics ensemble of elements of two or more populations of sizes to increase the packing fraction and hence the reflectance. Each element actively reflects and focuses incident light.

FIG. 5 is a cross-sectional view of a mini-optics ensemble 4 of rotatable elements 1 of two or more populations of particle sizes to increase the packing fraction and hence increase the energy of the reflected wave 30. The particles are contained between two elastomer sheets 11 of which the top sheet 11' is transparent. The large particles 12 and the small particles 13 can already be rotatable, or rendered rotatable by expanding the elastomers 11 by the application of a fluid thereto. The small particles 13 are disposed in the interstices of the monolayer arrangement of the large particles 12. Thus the small particles 13 just fit into the small pockets created by the conjunction of the large particles 12, to create more reflecting area than the very small area that these small particles 13 block of the large particles 12. Each element 1 actively reflects and focuses incident light.

Let us here consider the packing (compaction) of spheres in broad terms so that we may better understand the various trade-offs that may be undertaken in the choice of one set of particles 12 versus two sets of particles 12 and 13, or more; and the relative advantages that are also a function of the packing array. With one set of particles 12 of radius R in a square monolayer array in which any adjacent four particles have their centers at the corners of a square, the maximum packing fraction of circular mirrors is 0.785.

This means that as much as 21% the reflecting area is wasted, with less than 79% of the area available for reflection. If a second population of particles 13 are put into the interstices, their radii would need to be just slightly greater than $$r_s > R[\sqrt{2}-1] = 0.414R$$

so that they would fill the interstices of a monolayer of spheres (first population), and yet not fall through the openings. The maximum packing fraction in square array of two such sets of circular mirrors is 0.920. Thus just by the addition of a second population of particles 13, of the right size, the reflecting area can increase from about 79% to about 92% in a square array.

Now let us consider one set of particles 12 of radius R in a hexagonal monolayer array in which any adjacent six particles have their centers at the corners of a hexagon. In this case, the maximum packing fraction of the circular mirrors is 0.907. This means that only about 10% the reflecting area is wasted, with about 90% of the area available for reflection with one population of particles 12, by just going to a hexagonal array. If a second population of particles 13 are put into the interstices, their radii would need to be just slightly greater than:

$$r_h > R\left[\frac{2}{3}\sqrt{3} - 1\right] = 0.155R$$

so that they would fill the interstices of a monolayer of an hexagonal array of spheres (first population of particles 12), and yet not fall through the openings. The maximum packing fraction in hexagonal array of two such sets of circular mirrors is 0.951. Thus just by the addition of a second population of particles 13, of the right size, the reflecting area can increase from about 90% to about 95% in an hexagonal array.

The following two tables summarize the above results on packing fractions.

TABLE 1

Comparison of Hexagonal and Square Packing Fractions

|  | PF1 | PF2 | PF2/PF1 |
|---|---|---|---|
| Hexagonal Packing | 0.907 | 0.951 | 1.049 |
| Square Packing | 0.785 | 0.920 | 1.172 |

TABLE 2

Relative Gain of Hexagonal versus Square Packing

| PFh1/PFs1 | PFh2/PFs2 | PFh2/PFs1 |
|---|---|---|
| 1.155 | 1.034 | 1.211 |

Interesting conclusions can be drawn from TABLES 1 and 2 which can be guides for design tradeoffs even though the calculated quantities are upper limits of what can be attained in practice. TABLE 2 shows that just by going from a square monolayer array to an hexagonal monolayer array the reflecting area can be increased by about 16%. When two populations of particles 12 and 13 are used, there is only about a 3% improvement by going to an hexagonal array. The largest improvement is about 21% for a two population hexagonal array compared with a one population square array.

Figure 6:
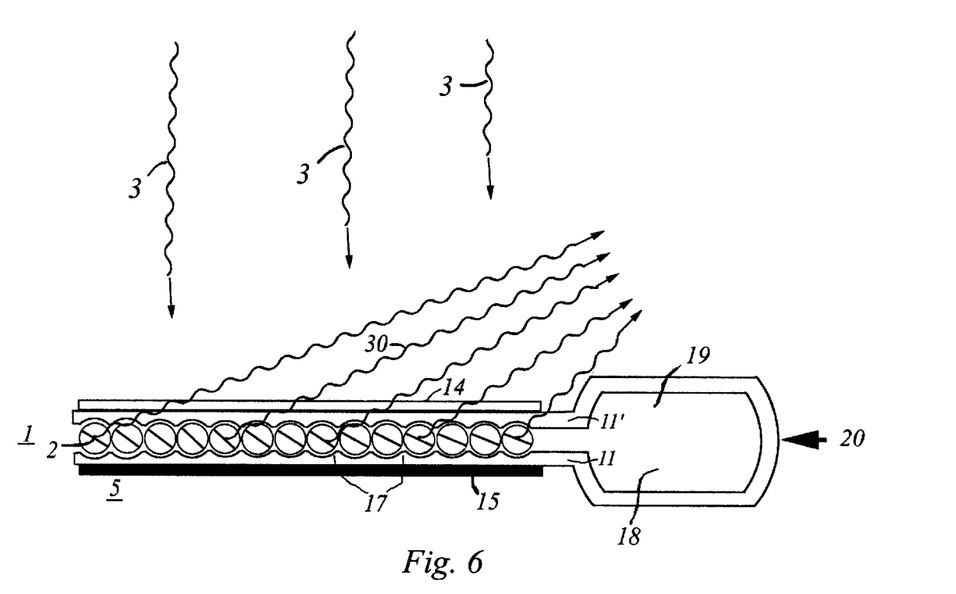
FIG. 6 is a cross-sectional view of a mini-optics ensemble of elements showing the overlay of a transparent ground plane on top and a resistive grid on the bottom to locally produce varying mini-electric fields for orienting the mini-mirrors to actively reflect and focus incident light.

FIG. 6 is a cross-sectional view of a mini-optics ensemble 5 of an individually rotatable monolayer of elements 1 showing the overlay of a transparent ground plane 14 on top and a resistive grid 15 on the bottom to locally produce varying mini-electric fields for orienting the mini-mirrors 2 to focus the incident light 3 as concentrated light of the reflected wave 30. The rotatable elements 1 are situated in ridged cells 17 between two elastomer sheets. For spherical or cylindrical elements 1, the ridged cellular structure 17 is conducive to holding the elements in grid position in the array structure. For elements 1 of disk shape, the ridged cells 17 are a valuable adjunct in maintaining the array structure and avoiding binding between the elements 1. When rotation of the elements 1 is desired, the effect of the torque applied by the field can be augmented by injecting a fluid 18 from a plenum reservoir 19 by a pressure applying means 20 to expand the separation of the sheets 11. It is desirable to utilize a fluid 18 whose index of refraction matches a transparent or translucent hemisphere or hemicylinder. In addition to providing a means to pressure the elastomer sheets 11 apart, the fluid 18 acts as a lubricant to permit the elements 1 to rotate freely when being guided into the proper orientation.

The ridged cells 17 can be created in thermoplastic elastomer sheets 11 by heating the sheets 11 to a slightly elevated temperature and applying pressure with the elements 1 between the sheets 11. In the case of elements 1 of disk shape 5, the ridged cells 17 can be created on each sheet individually. This gives twice the height for the cells, when two such sheets are put together to hold the elements 1.

A presently preferred maximum for the diameter of elements 1 is ~10 mm or more. The minimum diameter of elements 1 can be assessed from the Rayleigh limit $$d = \frac{0.61\lambda}{n \sin u} \sim 10\lambda,$$

where d is the minimum diameter of elements 1, $\lambda \sim 4000$ Å is the minimum visible wavelength, n is the index of refraction ~1 of element 1 (the medium in which the incident light is reflected), and u is the half angle of the light beam admitted by elements 1. Thus d ~40,000 Å ($4 \times 10^{-6}$ m) is the minimum diameter of elements 1.

If the focussing planar mini-mirrors concentrate the incident light by a factor of 100, the total increase in power density at a receiving surface is 100 times greater than directly incident light from the same distance. Thus a much brighter image or illumination is possible than just from the light source alone.

Figure 7:
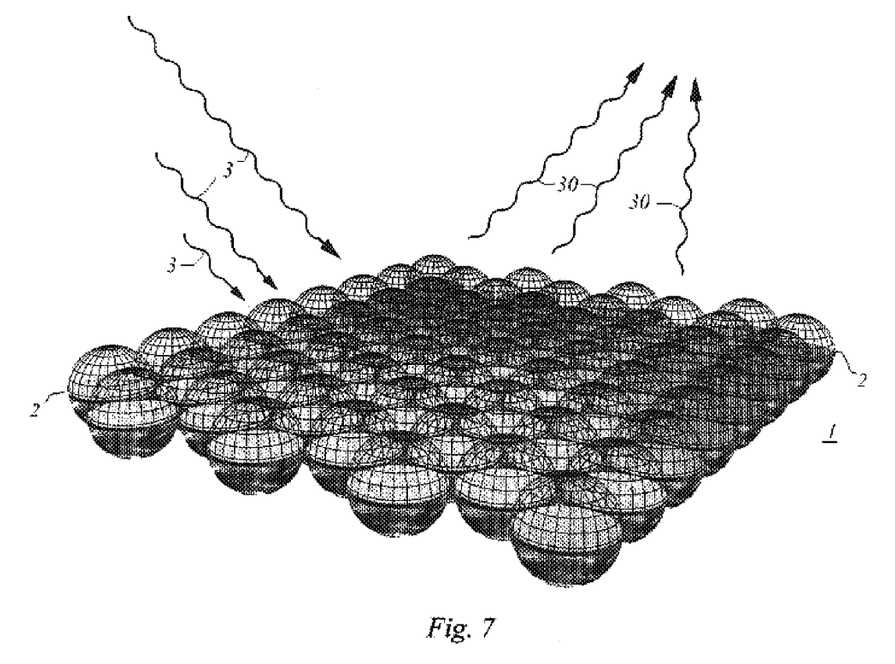
FIG. 7 is a perspective view of a two-dimensional array of the rotatable elements of an actively reflecting and focussing planar mirror.

FIG. 7 is a perspective view of a two-dimensional array of the rotatable elements 1 of a focussing a mini-optics light concentrator system with an active equatorial flat reflecting surface 2 which reflects incident light 3 and focuses it as a concentrated light wave 30 unto a receiving surface.

Figure 8:
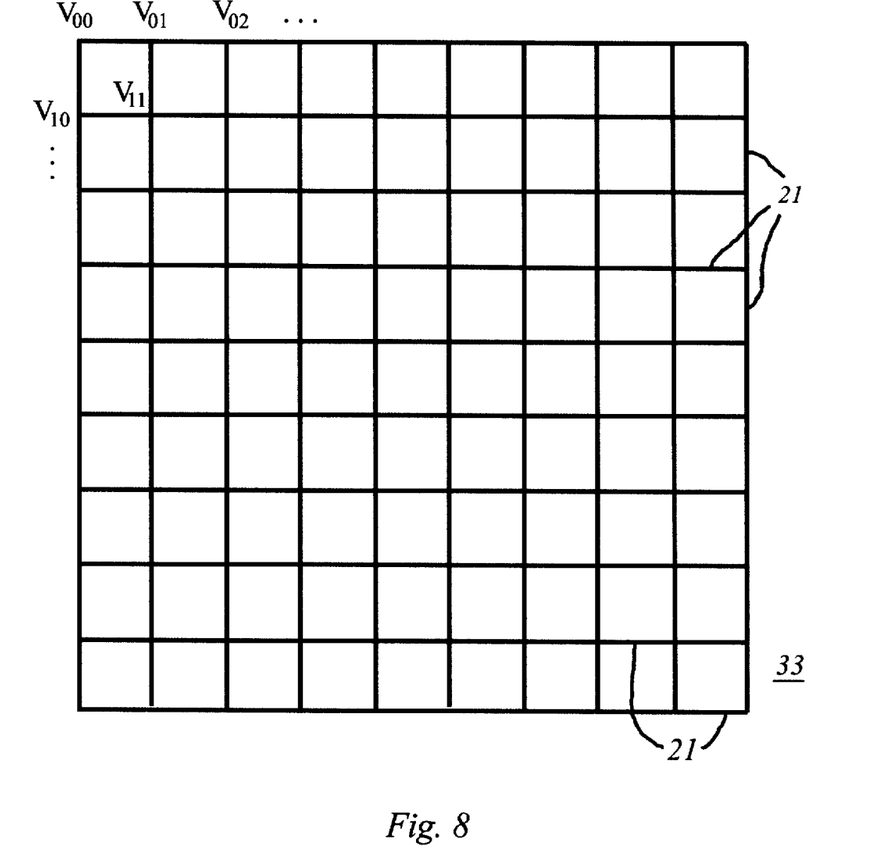
FIG. 8 is a schematic top view showing an electronic control grid for rotating the actively reflecting elements of a focussing planar mirror.

FIG. 8 is a schematic top view showing an electronic control grid 33 for rotating the active reflecting elements of a focussing a mini-optics light concentrator system. The elements 1 are capable of rotating in any direction (two-axis response) in responding to a selectively applied electric field by the electronic control grid 33. The electronic control grid 33 is made of resistive components 21. The mini-mirror/lens array with elements 1 is sandwiched between the resistive electronic control grid 33 (15 in FIG. 6) shown here and the transparent ground plane 14 as shown in the cross-sectional view of FIG. 6. The orientation of the elements 1 is determined by controlling the voltages V at the nodes of the grid such as those shown $V_{00}$, $V_{01}$, $V_{02}$, $V_{10}$, $V_{11}$ with voltage $V_{ij}$ at the ij th node. The voltage $V_{ij}$ can be controlled by a small inexpensive computer with analog voltage ouputs. The electronic control grid 33 is similar in construction and function to analogous grids used in personal computer boards, and in flat panel monitors. Similarly, small current loops around each cell provide local magnetic fields for the orientation function of elements with magnetic dipoles.

The voltage between successive nodes produces an electric field in the plane of the planar mini-mirror, and the voltage between a node and the ground plane produces an electric field perpendicular to the planar mini-mirror to control the orientation angle of the active reflecting/focussing mini-mirrors. The number of elements 1 per grid cell is determined by the degree of focussing desired: the higher the degree of focussing, the fewer the number of elements 1 per grid cell. In the case of elements 1 which contain a combination of orthogonal electrical and magnetic dipoles, the orientation function may be separated for orientation in the plane and orientation perpendicular to the plane by each of the fields.

After being positioned for optimal focussing angles of reflection, active elements 1 may be held in place by the elastomer sheets 11 (cf. FIGS. 5 and 6) with the voltages $V_{ij}$ being turned off to eliminate unnecessary power dissipation. When a new angular orientation of the elements 1 and 2 is desirable, the sheets 11 (cf. FIG. 6) are separated by injecting a fluid 18 from a plenum reservoir 19 by a pressure applying means 20. In the case of elements 10 (cf. FIG. 3) the reflecting angle needs to be held fixed by the control function such as the electronic control grid 33. To minimize power dissipation in this case it is desirable to make resistive components 21 highly resistive so that a given voltage drop is accomplished with a minimum of current flow and hence with a minimum of power dissipation.

Figure 9:
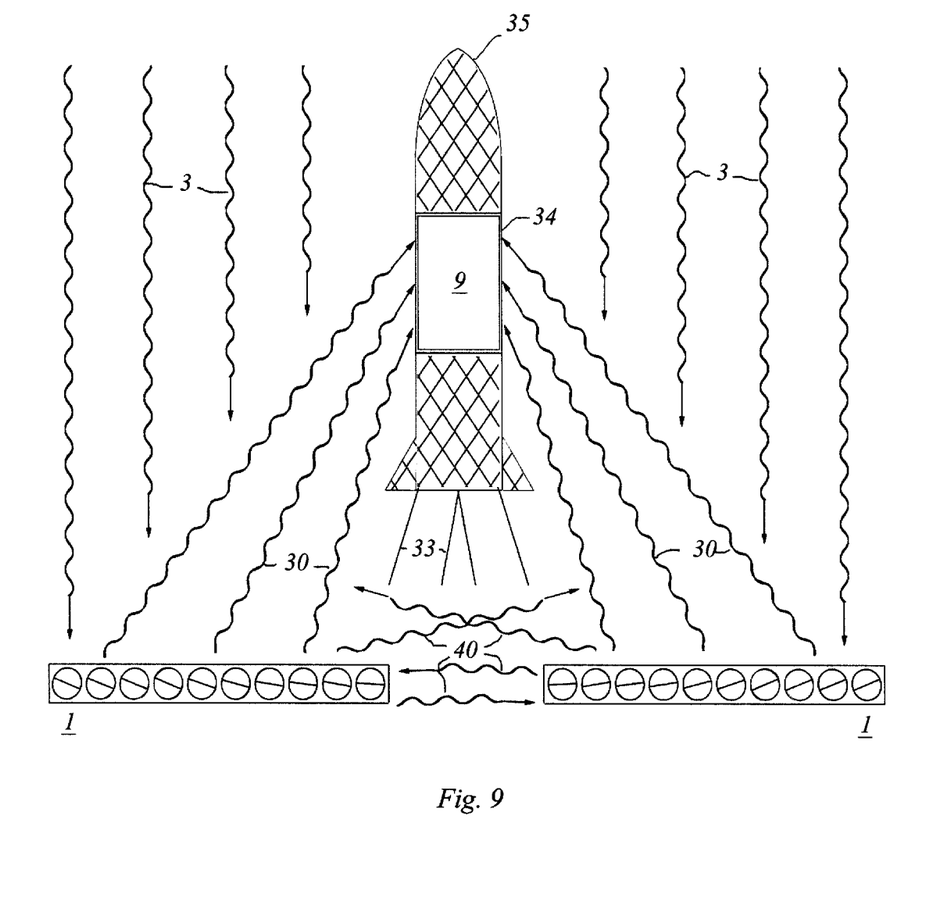
FIG. 9 illustrates a mini-optics light concentrator system that focussing solar energy into a rocket chamber.

FIG. 9 shows in cross-section a mini-optics light concentrator system wherein sunlight 3 is incident onto a mini-optics ring ensemble of reflecting elements 1, which reflect and focus a beam of light 30 onto the window 34 of a rocket ship 35 surrounding rocket fuel 9. The ring of elements 1 reflects light 40 (shown here and also in FIG. 10) between its mirrors to further concentrate the power density of the incident light 3. The concentrated solar energy from the beam 30 acts to heat the rocket fuel 9, thus reducing the weight required to produce the necessary impulse. Shown also for completeness is the rocket exhaust 33.

Let us consider the amplification capability of such a configuration, in the ideal case where all the incident light is reflected without absorption or losses. If between two sets of focussing planar mini-mirrors each concentrated the light energy by a factor of 100, the total increase in power density reaching the window 34 of the rocket ship 35 would be a factor of $(100)^2 = 10,000$ times greater than the incident power density. For n such reflectors each feeding into the other until finally reaching the collector, the increase would be $(100)^n$. Similarly, if focussing planar mini-mirrors were positioned to have n concentrating reflections between them before the light is reflected to the collector, the increase would also be $(100)^n$. Of course in a real case the increase would be less than this due to losses. The thermodynamic limit of such a scheme would be an effective temperature of the radiation at the window 34 no higher than the source temperature which in the case of the surface of the sun is ~6000 K. A practical limit would occur much before this related to temperatures well below the melting point of the materials used for the mini-mirror system. There is also an optical limit that the power per unit area per steradian cannot be increased by a passive optical system.

Figure 10:
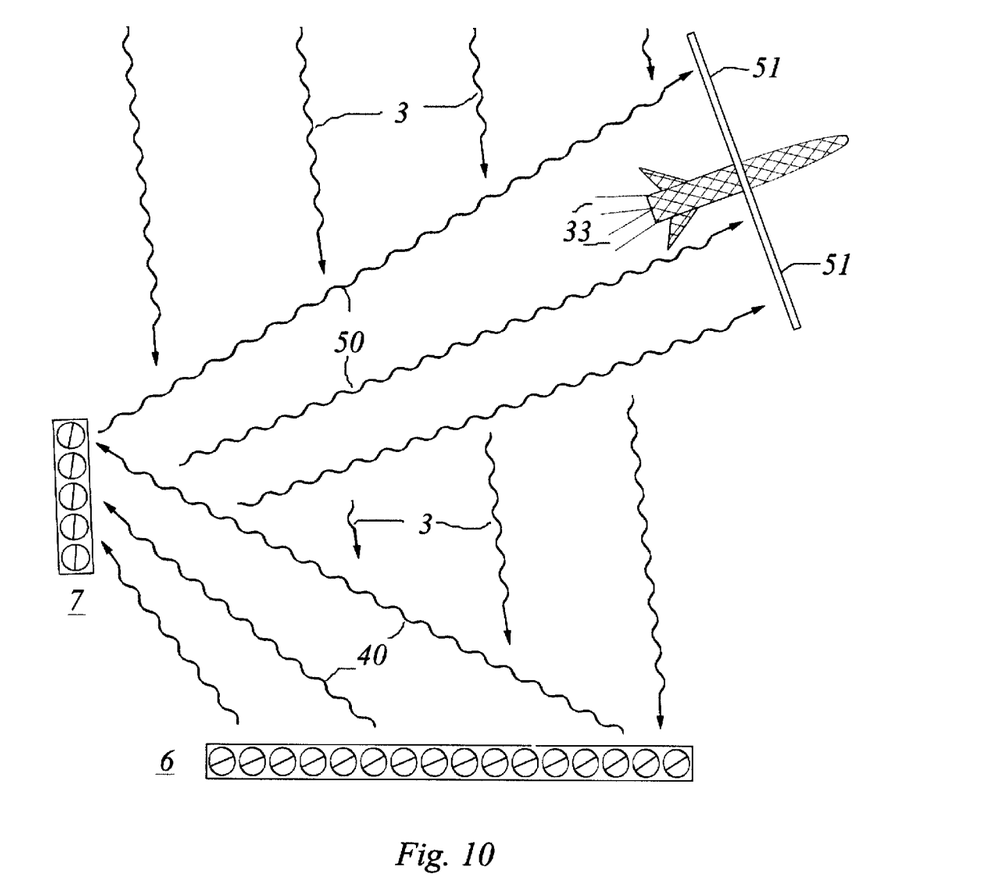
FIG. 10 illustrates a space-based mini-optics light concentrator system that focusses solar energy onto a rocket ship's solar sail.

FIG. 10 illustrates a space-based mini-optics light concentrator system that focusses solar energy onto a rocket ship's solar sail. Shown are a cross-sectional view of two sets of mini-optics ensembles 6, and 7 of rotatable elements 1 wherein sunlight 3 is incident on the first ensemble 6 and the reflected light 40 from this first ensemble 6 is focussed on a second space-based orbiting ensemble 7 to reflect light 50 which is further concentrated and focussed onto the solar sail 51 of the rocket ship 35 with rocket exhaust 33. The first mini-optics ensemble 6 may be ground-based, but is preferably space based.

The following equations govern the reflecting geometry for both FIGS. 9 and 10, where:

S is the location of a point light source, cartesian coordinates (sx,sy,sz).

D is the point at which light is to be focused onto, artesian coordinates (dx,dy,dz).

O is the center of the mirror, cartesian coordinates (ox, oy,oz).

N is the unit vector pointing normal to the mirror plane from the point O. Assume that S, D, and O are not collinear. Then in order that light from S be reflected onto D it is necessary that N lies in the plane of SDO, and that it bisects the angle s(S,O,D). The unit vector N determines the angle for a given mirror in the array to accomplish the desired focussing for the embodiments that are shown in the figures and variations of them.

We may calculate the unit vector N with the following formulas $$\vec{S} - \vec{O} = (sx-ox, sy-oy, sz-oz) \quad (1)$$

$$|\vec{S} - \vec{O}| = \sqrt{(sx-ox)^2 + (sy-oy)^2 + (sz-oz)^2} \quad (2)$$

$$\vec{D} - \vec{O} = (dx-ox, dy-oy, dz-oz) \quad (3)$$

$$|\vec{D} - \vec{O}| = \sqrt{(dx-ox)^2 + (dy-oy)^2 + (dz-oz)^2} \quad (4)$$

$$N = \frac{\frac{\vec{S}-\vec{O}}{|\vec{S}-\vec{O}|} + \frac{\vec{D}-\vec{O}}{|\vec{D}-\vec{O}|}}{\left|\frac{\vec{S}-\vec{O}}{|\vec{S}-\vec{O}|} + \frac{\vec{D}-\vec{O}}{|\vec{D}-\vec{O}|}\right|} \quad (5)$$

If the source point is very distant, then the incoming radiation is collimated and the direction of the line SO becomes independent of the point O. Likewise, if the detector point D is very distant, then the reflected rays aimed at D are all parallel. An example where the source point is distant is where the reflecting mirror system is being used to reflect sunlight, and an example where the detector point is very far away, is when the reflecting mirror system is directed at the solar sail 51 of a distant rocket ship 35.

For an isotropic incoherent light source, the radiation pressure in the vacuum of space is $$P = \frac{\rho}{3} = \frac{4\pi I}{3c} = \sigma \frac{T^4}{c} = \left\{\frac{\pi^2 k^4}{60 \hbar^3 c^2}\right\} \frac{T^4}{c},$$

where $\rho$ is the radiant energy density, I is the light intensity, c is the velocity of light, T is the absolute temperature, and $\sigma$ is the Stefan-Boltzmann constant which is given in the equation above as also related to $\hbar$ (Planck's constant)/$2\pi$, and the Boltzmann constant k. Because of the 4th power dependence of the pressure on the temperature of the light source, it is important to concentrate the light. As explained in conjunction with FIG. 9, the highest temperature attainable with this system is the surface temperature of the sun, 6000 K.

While the instant invention has been described with reference to presently preferred and other embodiments, the descriptions are illustrative of the invention and are not to be construed as limiting the invention. Thus, various modifications and applications may occur to those skilled in the art without departing from the true spirit and scope of the invention as summarized by the appended claims.

What is claimed is:

1. A miniature reflecting optics light concentrating system for boost assist of a rocket ship, comprising:
   (a) at least one rotatable miniature reflector positioned in the space between two sheets holding said rotatable miniature reflector;
   (b) the top sheet of said two sheets being transparent;
   (c) means to individually rotate said reflector within said sheets; and
   (d) a window in said rocket ship to receive said light.

2. The apparatus of claim 1, wherein each said rotatable miniature reflector is a sphere comprising:
   (a) a reflector embedded in said sphere; and
   (b) bipolar charge of opposite sign in each of the two hemispheres of said sphere.

3. The apparatus of claim 1, wherein each said rotatable miniature reflector is a sphere comprising:
   (a) a reflector embedded in said sphere; and
   (b) a magnetic dipole of opposite polarity in each of the two hemispheres of said sphere.

4. The apparatus of claim 1, wherein said sheets maintain said reflectors in fixed azimuthal orientation.

5. The apparatus of claim 1 with means for spreading apart said sheets.

6. The apparatus of claim 1, wherein the diameter of each said rotatable miniature reflector is in the range $4 \times 10^{-6}$ m to $10^{-1}$ m.

7. The apparatus of claim 1, wherein at least one sheet forms a cellular array.

8. The apparatus of claim 1, wherein said reflecting optics system projects light to heat the rocket ship propellant.

9. A miniature reflecting optics light concentrating system for boost assist of a rocket ship, comprising:
 (a) at least one cell;
 (a) a top and bottom fluid contained in said cell;
 (b) charged reflecting particles dispersed in said bottom fluid;
 (b) a formable rotatable reflecting surface of said particles at the interface of said two fluids; and
 (c) an electric field to form and rotate said reflecting surface.

10. The apparatus of claim 9, wherein the top fluid is transparent and the bottom fluid is of higher density.

11. The apparatus of claim 9, wherein the diameter of each said particle is in the range $4 \times 10^{-9}$ m to $10^{-2}$ m.

12. The apparatus of claim 9, wherein said system is caused to increase the temperature of rocket ship propellant.

13. A miniature reflecting optics light concentrating system for boost assist of a rocket ship, comprising:
 (b) a top and bottom fluid contained in said cell;
 (c) magnetic reflecting particles dispersed in said bottom fluid;
 (d) a formable rotatable reflecting surface of said particles at the interface of said two fluids; and
 (e) a magnetic field to form and rotate said reflecting surface.

14. The apparatus of claim 13, wherein the top fluid is transparent and the bottom fluid is of higher density.

15. The apparatus of claim 13, wherein said system heats rocket ship propellant.

16. A miniature reflecting optics light concentrating system for solar-sail assist of a rocket ship, comprising:
 (a) at least one rotatable miniature reflector positioned in the space between two sheets holding said rotatable miniature reflector;
 (b) the top sheet of said two sheets being transparent;
 (c) means to individually rotate said reflector within said sheets; and
 (d) a sail in said rocket ship to receive said light.

17. The apparatus of claim 16, wherein each said rotatable miniature reflector is a sphere comprising:
 (a) a reflector embedded in said sphere; and
 (b) bipolar charge of opposite sign in each of the two hemispheres of said sphere.

18. The apparatus of claim 16, wherein each said rotatable miniature reflector is a sphere comprising:
 (a) a reflector embedded in said sphere; and
 (b) a magnetic dipole of opposite polarity in each of the two hemispheres of said sphere.

19. A method of concentrating reflected light onto a rocket ship provided by an array of miniature reflectors, comprising the steps of:
 (a) rotating said array of miniature reflectors positioned between two sheets;
 (b) focussing said reflected light unto a given location of said rocket ship;
 (c) whereas at least one of said two sheets is transparent; and
 (d) providing means to individually rotate each reflector within said two sheets.

20. The method of claim 19 further comprising the step of rotating an array of miniature dipolar spheres.

21. The method of claim 19 further comprising the step of rotating an array of two populations of miniature dipolar spheres.

22. The method of claim 19 further comprising the step of rotating a reflecting monopolar charged fluid surface.

23. The method of claim 19 further comprising the step of rotating a reflecting ferrofluid surface.

24. The method of claim 19 further comprising the step of reflecting the light at said reflecting system unto at least a second reflecting system prior to reaching said given location.

* * * * *